US008844902B2

(12) United States Patent
Muehlhoff et al.

(10) Patent No.: US 8,844,902 B2
(45) Date of Patent: Sep. 30, 2014

(54) VALVE HOUSING

(75) Inventors: Holger Muehlhoff, Hoesbach (DE); Christoph Eisele, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 609 days.

(21) Appl. No.: 13/056,428

(22) PCT Filed: Jul. 20, 2009

(86) PCT No.: PCT/EP2009/005247
§ 371 (c)(1),
(2), (4) Date: Mar. 30, 2011

(87) PCT Pub. No.: WO2010/012393
PCT Pub. Date: Feb. 4, 2010

(65) Prior Publication Data
US 2011/0186768 A1 Aug. 4, 2011

(30) Foreign Application Priority Data
Jul. 29, 2008 (DE) .......................... 10 2008 035 356

(51) Int. Cl.
*F16K 27/00* (2006.01)
*F16L 9/00* (2006.01)
*F16K 17/10* (2006.01)

(52) U.S. Cl.
CPC .............. *F16K 17/105* (2013.01); *F16K 27/00* (2013.01)
USPC .......................................... 251/266; 138/177

(58) Field of Classification Search
USPC .................. 251/366, 118, 119, 120
See application file for complete search history.

(56) References Cited

U.S. PATENT DOCUMENTS

| | | | | |
|---|---|---|---|---|
| 5,192,026 A | * | 3/1993 | Rix et al. | 239/533.3 |
| 5,292,072 A | * | 3/1994 | Rix et al. | 239/533.3 |
| 5,819,808 A | * | 10/1998 | Smith | 138/177 |
| 6,364,641 B2 | * | 4/2002 | Mori | 417/569 |
| 7,121,523 B2 | * | 10/2006 | Adams et al. | 251/119 |
| 2005/0144558 A1 | | 6/2005 | Denton et al. | |
| 2008/0282879 A1 | * | 11/2008 | Arnold et al. | 92/169.1 |

FOREIGN PATENT DOCUMENTS

| | | |
|---|---|---|
| DE | 102006007363 | 8/2007 |
| EP | 0425236 | 5/1991 |
| EP | 0717227 | 6/1996 |
| EP | 1304476 | 4/2003 |
| WO | 01/86138 | 11/2001 |

OTHER PUBLICATIONS

International Search Report corresponding to PCT Application No. PCT/EP2009/005247, mailed Oct. 20, 2009 (German and English language document) (8 pages).

* cited by examiner

*Primary Examiner* — John K Fristoe, Jr.
*Assistant Examiner* — Daphne M Barry
(74) *Attorney, Agent, or Firm* — Maginot, Moore & Beck

(57) ABSTRACT

The invention discloses a valve housing (1) having a main bore (6) and at least one connecting bore or secondary bore (12, 20, 22, 36), the diameter of which is smaller than the diameter of the main bore. The connecting or secondary bores end at a side wall limiting the main bore, wherein the side wall has different material thicknesses being distributed at the circumference thereof. According to the invention, to reduce material stresses the valve housing has tension reducing grooves (14, 26, 28, 34) in the ending regions, said grooves being integrally molded into the side wall of the main bore.

18 Claims, 1 Drawing Sheet

VALVE HOUSING

BACKGROUND

The disclosure relates to a valve housing, and in particular to a valve housing having a main bore and at least one secondary bore.

A main bore in which a valve piston is guided and a plurality of connecting or secondary bores which open into the main bore are normally provided in such valve housings. Valves, for example, are screwed into the connecting or secondary bores, or the bores lead to connections having valves. In this case, the diameters of the connecting or secondary bores are often markedly smaller than those of the main bore.

At such orifices or bore intersections, the basic shape of which is mostly defined by the geometric section of two circular cylinders having different diameters, locally high material stresses occur, in particular when the valve is used within the high-pressure range. These material stresses are increased if the outer wall of the valve housing has different thicknesses. As a result, the material of the valve housing, which usually consists of gray cast iron, is highly stressed, and cracks can be produced in the orifice regions in which the connecting or secondary bores open into the main bore.

Accordingly, the object of the disclosure is to avoid high material stresses in the orifice regions in which connecting or secondary bores open into main bores of valve housings having different wall thicknesses.

The valve housing according to the disclosure has a main bore and one or more connecting or secondary bores, the diameters of which are smaller than the diameter of the main bore, wherein the connecting or secondary bores open into a side wall defining the main bore. According to the disclosure, the valve housing has a respective stress-reducing groove in these orifice regions for reducing material stresses, wherein said stress-reducing groove connects the secondary bore to the main bore. Due to these grooves, valve housing walls having small thicknesses or having different thicknesses are also possible without cracks occurring in the orifice regions by the material being subjected to excessive tensile stress. The stresses which are produced by pressurizing of the valve fitting bore or main bore by different external dimensions and resulting different deformations at thin and thick walls, respectively, can be minimized or optimized by the stress-reducing grooves according to the disclosure.

It is preferred if the stress-reducing groove according to the disclosure has an increase in cross section starting from an orifice on the secondary bore side up to an orifice on the main bore side. In a preferred development of the stress-reducing groove, the cross section thereof is of roughly sickle-shaped design as viewed along the longitudinal axis of the main bore.

Due to this shaping, a valve housing wall of reduced thickness is possible in the orifice region without cracks occurring by the material being subjected to excessive tensile stress.

In a preferred exemplary embodiment of the valve housing according to the disclosure, the axial extent of the orifice on the main bore side as viewed in the direction of the longitudinal axis of the main bore is substantially smaller than the circumferential extent of the orifice on the main bore side along the circumference of the main bore.

For production reasons, it is preferred if the stress-reducing groove has substantially the shape of a circular disk segment, the diameter of which is smaller than the diameter of the main bore in the orifice region, wherein the diameter of the circular disk segment is preferably about ⅔ of the diameter of the main bore in the orifice region. This shaping simplifies the production of the groove since a side milling cutter can first of all be inserted concentrically into the main bore of the valve housing and can then be moved radially into the side wall defining the main bore for forming the groove.

Depending on the design of the valve housing according to the disclosure, the circumferential extent of the orifice on the main bore side is at most half the circumference of the main bore in the orifice region, wherein the circumferential extent of the orifice on the main bore side is preferably about one-quarter of the circumference of the main bore in the orifice region.

In a preferred variant of the valve housing, the longitudinal axes of the main bore and of the connecting or secondary bore intersect at right angles.

It is preferred, as an alternative to milled stress-reducing grooves, if said stress-reducing grooves are formed by integrally cast recesses or apertures. The recesses or apertures can be produced by projections correspondingly formed on the core of a casting mold.

BRIEF DESCRIPTION OF THE DRAWINGS

A preferred exemplary embodiment of the disclosure is described in detail below with reference to the figures. In the drawings:

FIG. 1 shows a preferred exemplary embodiment of a valve housing 1 according to the disclosure of a pilot-controlled pressure relief valve for use within the high-pressure range. The pressure relief valve limits a system pressure applied to a main connection 2 and relieves this main connection 2 to the tank connection 4 if the maximum pressure is exceeded. To this end, a valve body (not shown) is fixedly screwed in place in a substantially circular-cylindrical valve fitting bore or main bore 6. This main bore 6 extends approximately perpendicularly in the valve housing 1 in the illustration shown in FIG. 1.

Until a predetermined maximum system pressure is reached at the main connection 2, the valve body (not shown) remains closed, and a passage in the valve body is opened if the maximum pressure is exceeded, such that pressure medium can flow off from the main connection 2 through a tank passage 10 to the tank connection 4.

The valve has a nonmetallic seal at the separating point 50 between main connection 2 and tank connection 4.

Figure 1:
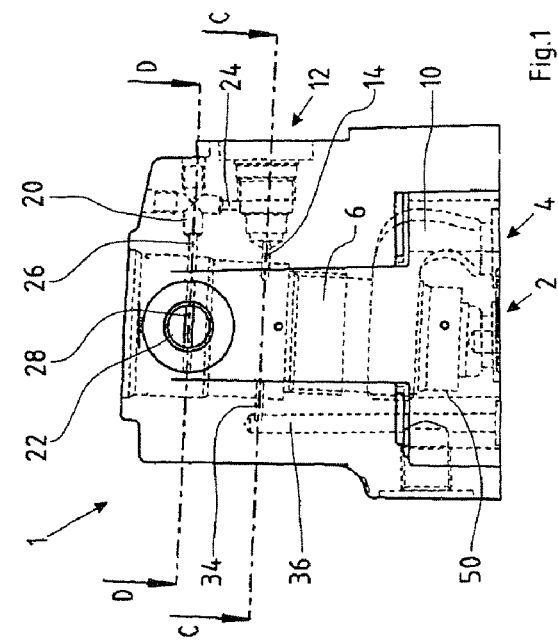
FIG. 1 shows a preferred exemplary embodiment of a valve housing according to the disclosure of a high-pressure relief valve in a side view.

The maximum system pressure, which at the main connection 2 leads to an upward opening movement of the valve body in FIG. 1, can be set by a control pressure which is applied to a top side of the valve body and therefore acts downward in FIG. 1. This control pressure is determined by a pilot-control valve (not shown) which is screwed to a pilot-control valve bore 12 of the valve housing 1. The pilot-control valve bore 12 has a smaller diameter than the main bore 6, the longitudinal axes of the two bores intersecting approximately at right angles.

Figure 2:
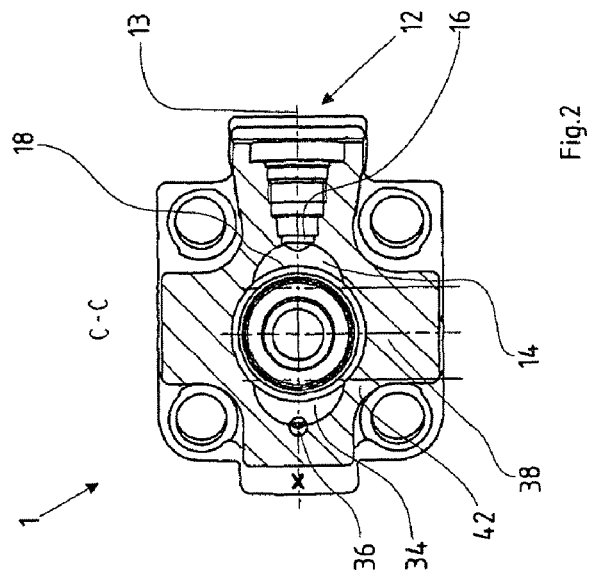
FIG. 2 shows a section C-C of the valve housing according to FIG. 1.

FIG. 2 shows a section through the plane C-C in FIG. 1 and therefore also passes through the pilot-control valve bore 12. A stress-reducing groove 14 according to the disclosure is arranged at the transition of the pilot-control valve bore 12 into the main bore 6, or in the orifice region in which said pilot control valve bore 12 opens into said main bore 6. In the horizontal section C-C according to FIG. 2, this groove 14 has the shape of a symmetrical sickle or of a circular segment. It is shown in FIG. 1 that the stress-reducing groove 14 has a relatively small and substantially uniform extent in the direction of the longitudinal axis of the main bore 6.

The depth decreasing toward the end sections of the groove 14 can be seen in FIG. 2, thereby resulting in a constant increase in the cross section of the stress-reducing groove 14 starting from an orifice 16 on the side of the control valve bore up to an orifice 18 on the side of the main bore.

Figure 3:
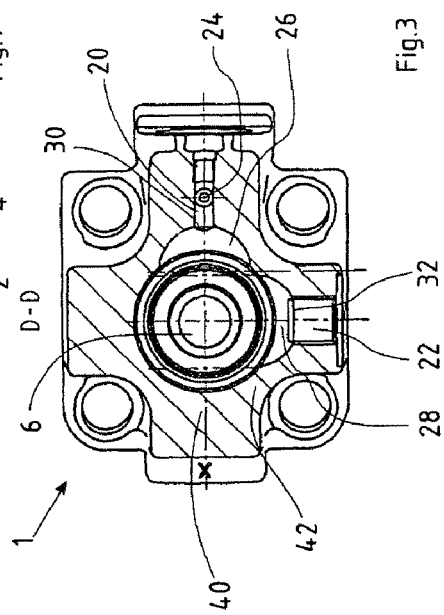
FIG. 3 shows a further section D-D of the valve housing according to FIG. 1.

In addition to the pilot-control valve bore 12, two further secondary bores 20, 22 arranged perpendicularly to one another are arranged in the section of the main bore 6 on the control pressure side (at the top in FIG. 1), and these secondary bores 20, 22 both open as radial bores into the main bore 6. The secondary bores 20, 22 are arranged in the common section plane D-D, which is shown in FIG. 3. The secondary bore 20 is connected to the pilot-control valve bore 12 by a connecting passage 24, whereas the secondary bore 22 is a connection for control pressure medium to the tank.

As shown in FIG. 3, the two secondary bores 20, 22, in their respective orifice region, have a stress-reducing groove 26, 28 which has substantially the shape of the stress-reducing groove 14. In this case, an orifice 30 of the groove 26 on the secondary bore side has a smaller cross section than the groove 14, and an orifice 32 of the groove 28 on the secondary bore side has a larger cross section than the groove 14.

A fourth stress-reducing groove 34 according to the disclosure which is arranged in the orifice region of a relief passage 36 running approximately parallel to the main bore 6 is shown in FIGS. 1 and 2. The shape of the groove 34 corresponds substantially to the shape of the groove 26.

In a simple production process for forming the stress-reducing grooves 14, 26, 28, 34 according to the disclosure, a side milling cutter, the diameter of which is about ⅔ of the diameter of the main bore 6, can be inserted into said main bore and can cut out the stress-reducing grooves 14, 26, 28, 34 by a sideways movement (e.g. to the right or left in FIG. 2). In this case, the width of the grooves 14, 26, 28, 34 can be selected by the thickness of the side milling cutter.

Stresses which occur in the material of the valve housing 1 according to the prior art in the orifice regions in which secondary bores open into main bores are reduced by the stress-reducing grooves 14, 26, 28, shown in the exemplary embodiment according to FIGS. 1 to 3, such that crack formation is avoided even during constant and high loading by pressure medium. Critical in this case are the regions 38, 40 (see FIGS. 2 and 3) in which such secondary bores are arranged. In conventional designs, cracks occur in said regions, even if the surrounding regions 42 have a large wall thickness.

According to the disclosure, not only the critical regions but also in particular surrounding, often thinner locations 42 of the housing can be designed in a space-saving manner using less material, without excessively high stresses occurring at the critical locations 38, 40 as a result. The valve housing 1 according to the disclosure can thereby be designed in a compact manner using less material and at the same time so as to be resistant to high pressure.

With uniform external dimensions, valves having the valve housings according to the disclosure can be designed to be larger and thus with a higher capacity.

In deviation from the exemplary embodiment, shown in FIGS. 1 to 3, of a valve housing 1 of a pressure relief valve having stress-reducing grooves according to the disclosure, these grooves can also be incorporated in other valve types.

The dimensions or relative sizes can differ from the grooves shown; thus, the grooves can extend over a longer circumferential section of the main bore 6 (up to at most half the circumference), the groove depths can vary and the width of the grooves can be, for example, greater (than shown in FIG. 1).

Furthermore, the geometrical shape of the grooves can also differ from the sickle or circular segment shape shown (e.g. a V shape).

Disclosed is a valve housing having a main bore and a connecting or secondary bore, the diameter of which is smaller than the diameter of the main bore. The connecting or secondary bore opens into a side wall defining the main bore, wherein the side wall has different material thicknesses distributed over the circumference. According to the disclosure, the valve housing has a stress-reducing groove in this orifice region for reducing material stresses, said stress-reducing groove being incorporated into the side wall of the main bore.

The stresses which are produced by pressurizing of the valve fitting bore or main bore by different external dimensions and resulting different deformations at thin and thick walls, respectively, can be minimized or optimized by the stress-reducing grooves.

The invention claimed is:
1. A valve housing comprising:
   a main bore;
   at least one secondary bore having a maximum diameter smaller than a maximum diameter of the main bore; and
   a stress-reducing groove extending from a first sidewall of the main bore to the at least one secondary bore such that material stresses between the main bore and the at least one secondary bore are reduced, the stress-reducing groove having a substantially uniform length in a direction of a longitudinal axis of the bore from the first sidewall of the main bore to the at least one secondary bore,
   wherein the stress-reducing groove has a first orifice opening to the at least one secondary bore and a second orifice opening to the main bore,
   wherein the second orifice has an axial extent in the direction of the longitudinal axis of the main bore and has a circumferential extent in a direction about the longitudinal axis of the main bore, and
   wherein the axial extent of the second orifice is less than the circumferential extent of the second orifice.
2. The valve housing as claimed in claim 1, wherein the stress-reducing groove has an increase in cross section starting from the first orifice opening to the at least one secondary bore to the second orifice opening to the main bore.
3. The valve housing as claimed in claim 2, wherein a cross section of the stress-reducing groove has a sickle-shaped configuration as viewed in a plane perpendicular to the longitudinal axis of the main bore.
4. The valve housing as claimed in claim 2, wherein the stress-reducing groove has a circular disk segment configuration, the diameter of which is smaller than a diameter of the main bore at the second orifice.
5. The valve housing as claimed in claim 4, wherein the diameter of the circular disk segment is about two-thirds of the diameter of the main bore at the second orifice.
6. The valve housing as claimed in claim 2, wherein the circumferential extent of the second orifice about the longitudinal axis of the main bore is less than, or equal to half a circumference of the main bore at the second orifice.
7. The valve housing as claimed in claim 6, wherein the circumferential extent of the second orifice is about one-quarter of the circumference of the main bore at the second orifice.

8. The valve housing as claimed in claim 1, wherein the at least one secondary bore is a radial bore having a longitudinal axis which intersects the longitudinal axis of the main bore at an angle about equal to ninety degrees.

9. The valve housing as claimed in claim 1, wherein the stress-reducing groove is formed as an integrally cast recess.

10. A valve housing comprising:
   a main bore; and
   at least one secondary bore,
   wherein (i) a first maximum diameter of the least one secondary bore is smaller than a second maximum diameter of the main bore, and (ii) the at least one secondary bore is connected to the main bore by a stress-reducing groove configured to reduce material stresses in an orifice region of the valve housing, the stress reducing groove having a substantially uniform axial extent in a direction of a longitudinal axis of the main bore from the first sidewall of the main bore to the at least one secondary bore,
   wherein the stress-reducing groove has a first orifice opening to the at least one secondary bore and a second orifice opening to the main bore,
   wherein the second orifice has an axial extent in the direction of the longitudinal axis of the main bore and has a circumferential extent in a direction about the longitudinal axis of the main bore, and
   wherein the axial extent of the second orifice is less than the circumferential extent of the second orifice.

11. The valve housing as claimed in claim 10, wherein the stress-reducing groove has a sickle-shaped configuration along the longitudinal axis of the main bore.

12. The valve housing as claimed in claim 10, wherein the stress-reducing groove increases in cross section starting from the first orifice on the at least one secondary bore to the second orifice on the main bore.

13. The valve housing as claimed in claim 10, wherein the stress-reducing groove has a circular disk segment configuration, and a diameter of the circular disk segment is smaller than a diameter of the main bore in the orifice region.

14. The valve housing as claimed in claim 13, wherein the diameter of the circular disk segment is equal to about two-thirds of the diameter of the main bore in the orifice region.

15. The valve housing as claimed in claim 12, wherein the circumferential extent of the second orifice on the main bore is less than or equal to half a circumference of the main bore in the orifice region.

16. The valve housing as claimed in claim 15, wherein the circumferential extent of the second orifice on the main. bore is about equal to one-quarter of the circumference of the main bore in the orifice region.

17. The valve housing as claimed in claim 10, wherein the at least one secondary bore is a radial bore having a first longitudinal axis and the first longitudinal axis intersects the longitudinal axis of the main bore at an angle about equal to ninety degrees.

18. The valve housing as claimed in claim 10, wherein the stress-reducing groove is formed as an integrally cast recess.

\* \* \* \* \*

UNITED STATES PATENT AND TRADEMARK OFFICE
CERTIFICATE OF CORRECTION

| | | |
|---|---|---|
| PATENT NO. | : 8,844,902 B2 | |
| APPLICATION NO. | : 13/056428 | |
| DATED | : September 30, 2014 | |
| INVENTOR(S) | : Holger Muehlhoff and Christoph Eisele | |

It is certified that error appears in the above-identified patent and that said Letters Patent is hereby corrected as shown below:

On the title page, item 54 and in the specification, column 1, line 1, in the Title, delete the published title "VALVE HOUSING" and insert the new title --STRESS REDUCER AT A FLUID FLOW PASSAGE JUNCTION-- in its place.

In the claims

Column 4, in claim 1, line 32, delete the word "length" and insert the word --height-- in its place.

Column 4, in claim 1, line 33, insert the word --main-- between the words "the" and "bore".

Column 4, in claim 1, line 39, delete the phrase "an axial extent" and insert the phrase --a height-- in its place.

Column 4, in claim 1, line 41, delete the phrase "circumferential extent" and insert the word --width-- in its place.

Column 4, in claim 1, line 43, delete the phrase "axial extent" and insert the word --height-- in its place.

Column 4, in claim 1, line 44, delete the phrase "circumferential extent" and insert the word --width-- in its place.

Column 4, in claim 6, line 61, delete the phrase "circumferential extent" and insert the word --width-- in its place.

Column 4, in claim 6, line 62, delete the "," between the words "than" and "or".

Column 4, in claim 7, line 65, delete the phrase "circumferential extent" and insert the word --width-- in its place.

Signed and Sealed this
Fourteenth Day of June, 2016

Michelle K. Lee
*Director of the United States Patent and Trademark Office*

CERTIFICATE OF CORRECTION (continued)

Column 5, in claim 10, line 16, delete the phrase "axial extent" and insert the word --height-- in its place.

Column 5, in claim 10, line 23, delete the phrase "an axial extent" and insert the phrase --a height-- in its place.

Column 5, in claim 10, line 25, delete the phrase "circumferential extent" and insert the word --width-- in its place.

Column 5, in claim 10, line 27, delete the phrase "axial extent" and insert the word --height-- in its place.

Column 5, in claim 10, line 28, delete the phrase "circumferential extent" and insert the word --width-- in its place.

Column 6, in claim 15, line 16, delete the phrase "circumferential extent" and insert the word --width-- in its place.

Column 6, in claim 16, line 20, delete the phrase "circumferential extent" and insert the word --width-- in its place.

Column 6, in claim 16, line 20, delete the "." between the words "main" and "bore".